(12) United States Patent　　(10) Patent No.: US 11,473,779 B2
Padgett et al.　　(45) Date of Patent: Oct. 18, 2022

(54) GAS VALVE FOR A COOKTOP APPLIANCE

(71) Applicant: Electrolux Home Products, Inc., Charlotte, NC (US)

(72) Inventors: Michael D. Padgett, Springfield, TN (US); Brian Martin, Nashville, TN (US); John Ballman, Cottontown, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 52 days.

(21) Appl. No.: 16/952,000

(22) Filed: Nov. 18, 2020

(65) Prior Publication Data

US 2021/0148572 A1　　May 20, 2021

Related U.S. Application Data

(60) Provisional application No. 62/937,748, filed on Nov. 19, 2019.

(51) Int. Cl.
*F16K 25/00*　　(2006.01)
*F23N 1/00*　　(2006.01)
*F16K 5/10*　　(2006.01)
*F24C 3/02*　　(2021.01)

(52) U.S. Cl.
CPC .............. *F23N 1/007* (2013.01); *F16K 5/103* (2013.01); *F24C 3/027* (2013.01); *F23N 2235/24* (2020.01); *F23N 2241/08* (2020.01)

(58) Field of Classification Search
CPC ...... F23N 1/007; F23N 2235/24; F16K 5/103; F16K 5/16; F16K 5/161; F16K 35/027
See application file for complete search history.

(56) References Cited

U.S. PATENT DOCUMENTS

| 1,739,991 | A | * | 12/1929 | Schenker | ............... | F16K 35/027 |
| | | | | | | 251/97 |
| 1,917,981 | A | * | 7/1933 | Kindl | .................... | F16K 35/027 |
| | | | | | | 251/95 |
| 2,188,088 | A | | 1/1940 | Stafford et al. | | |
| 2,194,714 | A | * | 3/1940 | Mueller | ................ | F16K 35/027 |
| | | | | | | 251/297 |

(Continued)

FOREIGN PATENT DOCUMENTS

| GB | 369681 | 3/1932 |
| GB | 2239075 | 6/1991 |
| GB | 2315534 | 2/1998 |

*Primary Examiner* — Reinaldo Sanchez-Medina
(74) *Attorney, Agent, or Firm* — Pearne & Gordon LLP (57) ABSTRACT

A gas valve for a cooking appliance is provided and includes a valve housing defining a valve chamber therein. A plug is disposed within the valve chamber. A valve stem interacts with the plug such that rotation of the valve stem correspondingly rotates the plug to selectively permit a flow of gas through the gas valve. The valve stem is axially translatable between a locked position wherein rotation thereof is inhibited and an unlocked position wherein rotation thereof is permitted. A first spring exerts a compressive force against the valve stem, toward the plug, to bias the valve stem into the locked position. A second spring exerts a compressive force against the plug in order to seat the plug within the valve chamber regardless whether the valve stem is in the locked or the unlocked position.

17 Claims, 9 Drawing Sheets

(56) References Cited

U.S. PATENT DOCUMENTS

| | | | | |
|---|---|---|---|---|
| 2,262,703 | A | * | 11/1941 | Stuckenholt ............ F16K 35/00 251/95 |
| 2,723,102 | A | * | 11/1955 | Mueller ................ F16K 5/0214 251/297 |
| 2,963,042 | A | * | 12/1960 | Dolby ..................... F16K 5/103 137/614.19 |
| 3,260,497 | A | | 7/1966 | Blackford |
| 5,067,651 | A | * | 11/1991 | Genbauffe .............. F23N 5/067 431/42 |
| 5,937,846 | A | * | 8/1999 | Martin .................... F24C 3/128 137/614.19 |
| 8,104,507 | B2 | * | 1/2012 | Chang .................... F23N 1/007 137/599.17 |
| 2003/0010952 | A1 | | 1/2003 | Morete |
| 2007/0007482 | A1 | | 1/2007 | DeHaan |
| 2007/0012308 | A1 | * | 1/2007 | Huang ..................... F24C 3/12 126/39 N |
| 2007/0125975 | A1 | | 6/2007 | Jones et al. |
| 2019/0033908 | A1 | | 1/2019 | Ha |

\* cited by examiner

GAS VALVE FOR A COOKTOP APPLIANCE

CROSS-REFERENCE TO RELATED APPLICATIONS

This application claims the benefit of US Provisional Patent Application Ser. No. 62/937,748 filed Nov. 19, 2019, incorporated herein by reference.

FIELD OF THE INVENTION

This application relates generally to a gas valve that selectively directs a flow of gas to a downstream gas burner of a cooking appliance, and more specifically, to such a valve with a pull-to-turn safety feature.

BACKGROUND OF THE INVENTION

Conventional cooktop appliances are configured to require a two-step procedure to activate a gas burner based on agency regulations. The instant application discloses a valve requiring a two-step procedure in order to initiate a flow of gas to a burner.

BRIEF SUMMARY

In accordance with one aspect, there is provided a gas valve for a cooking appliance. The gas valve includes a valve housing defining a valve chamber therein. A plug is disposed within the valve chamber and is configured to selectively permit gas to flow through the gas valve. A valve stem interacts with the plug such that rotation of the valve stem correspondingly rotates the plug to selectively permit said flow. The valve stem is axially translatable between a locked position wherein rotation thereof is inhibited and an unlocked position wherein rotation thereof is permitted. A first spring exerts a compressive force in a first direction against the valve stem, toward the plug, to bias the valve stem into its locked position. A second spring exerts a compressive force in the first direction against the plug in order to seat the plug within the valve chamber regardless whether the valve stem is in the locked or the unlocked position.

In accordance with another aspect, there is provided a gas cooktop appliance including a gas burner provided at a cooktop surface. A control knob is located above a control panel and is axially translatable between a locked position wherein rotation thereof is inhibited and an unlocked position wherein rotation thereof is permitted. A gas valve is operatively coupled to the control knob. The gas valve includes a valve housing defining a valve chamber therein. A plug is disposed within the valve chamber and is configured to selectively permit gas to flow therethrough to the gas burner. A first spring exerts a compressive force that biases the control knob into its locked position toward the control panel. A second spring exerts a compressive force against the plug in order to seat the plug within the valve chamber regardless of whether the control knob is in the locked or the unlocked position.

In accordance with a further aspect, there is provided a gas valve for a cooking appliance. The gas valve includes a valve housing including a valve body and a cap assembled together to define a valve chamber therebetween. The valve body has a lip surrounding a mouth of a valve body chamber thereof. The valve chamber includes the valve body chamber. The lip has a detent formed therein. A plug is seated within the valve body chamber and is configured to selectively permit gas to flow through the gas valve. The plug has a slot formed therein. A valve stem has first and second ends and includes a flange, a drive tang, and a lock tang all located at the first end thereof. The flange has opposite first and second flange surfaces. The drive tang extends axially from the first end of the valve stem and is axially, slidably received within the slot formed in the plug. The lock tang extends radially outwards from the flange. The drive tang interacts with the slot in the plug such that rotation of the valve stem correspondingly rotates the plug to selectively permit the gas flow. The valve stem is axially translatable between a locked position wherein rotation thereof is inhibited and an unlocked position wherein rotation thereof is permitted. The detent is configured to receive the lock tang therein when the valve stem is in the locked position in order to inhibit rotation of the valve stem. A first spring is compressively engaged between the first flange surface and the cap and exerts a compressive force in a first direction against the flange, toward the plug, to bias the valve stem into the locked position. A second spring is compressively engaged between the second flange surface and the plug and exerts a compressive force in the first direction against the plug in order to seat the plug within the valve chamber regardless of whether the valve stem is in the locked or the unlocked position.

DESCRIPTION OF EXAMPLE EMBODIMENTS

Figure 1:
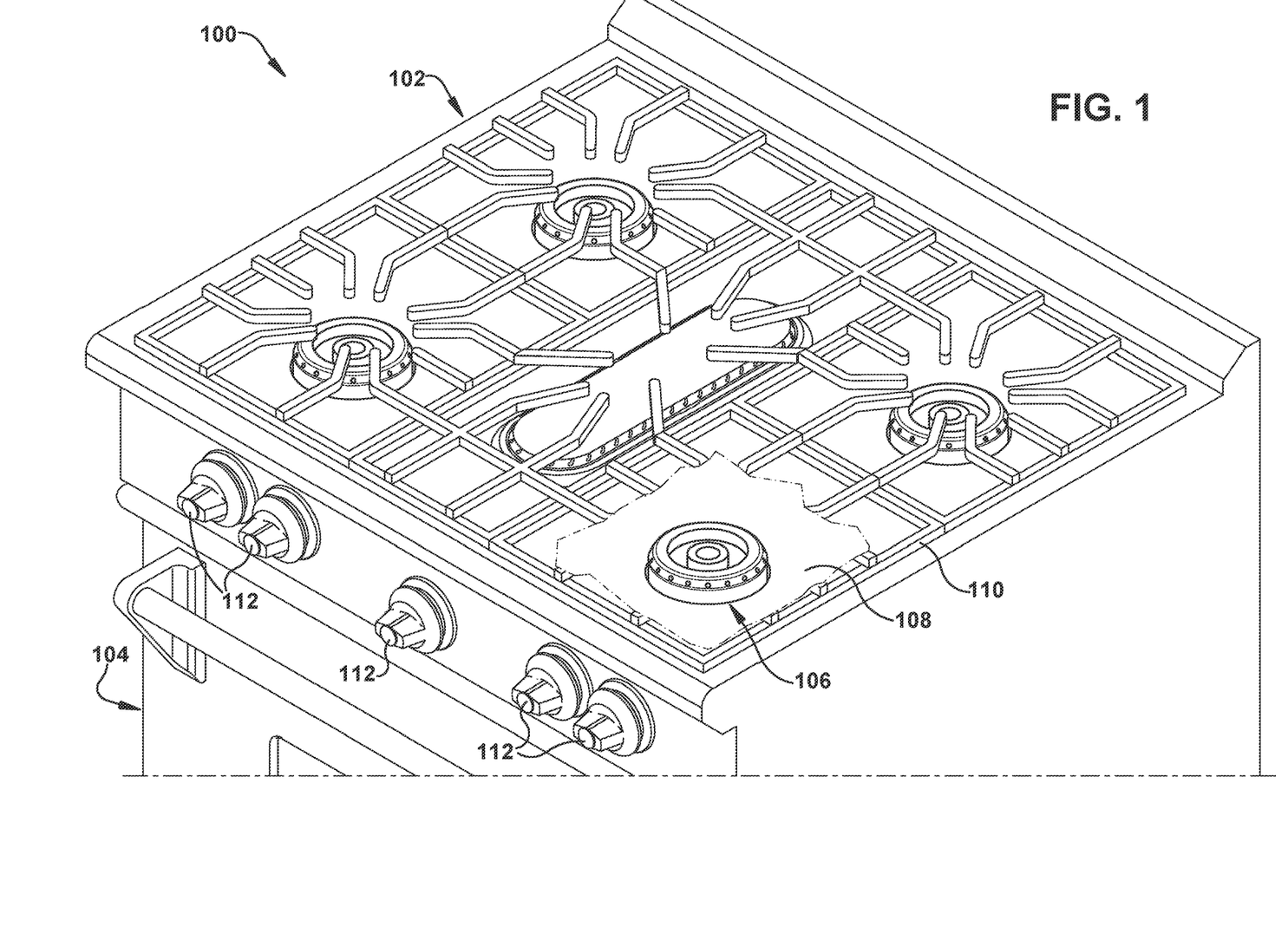
FIG. 1 is a perspective view of an example cooking appliance having a cooktop and an oven.

Referring now to the drawings, FIG. 1 depicts a cooking appliance 100 that can be a domestic appliance configured for in-home use, or an industrial appliance for commercial applications. In the illustrated example, the cooking appliance 100 includes a cooktop 102 and an oven 104; however, the cooking appliance 100 need not include the oven 104 (i.e., the cooking appliance 100 can be a stand-alone cooktop). As shown, the cooktop 102 is located at a top of the cooking appliance 100 and includes a gas burner 106 located at or above a cooktop surface 108 of the cooktop 102. The cooktop 102 also includes a grate 110 disposed above the cooktop surface 108 and configured to support a cooking vessel (not shown) thereon. As further shown, control knobs 112 are disposed at a (front) control panel of the cooktop 102 (e.g., a front-control appliance). However, it is contemplated that the control knobs 112 may be provided in or at the cooktop surface 108 (e.g. in the case of a drop-in cooktop) or in a rear control panel (e.g. as in a conventional rear-control range). During operation, a user interacts with the control knobs 112 to activate/control respective gas burners 106.

Figure 2:
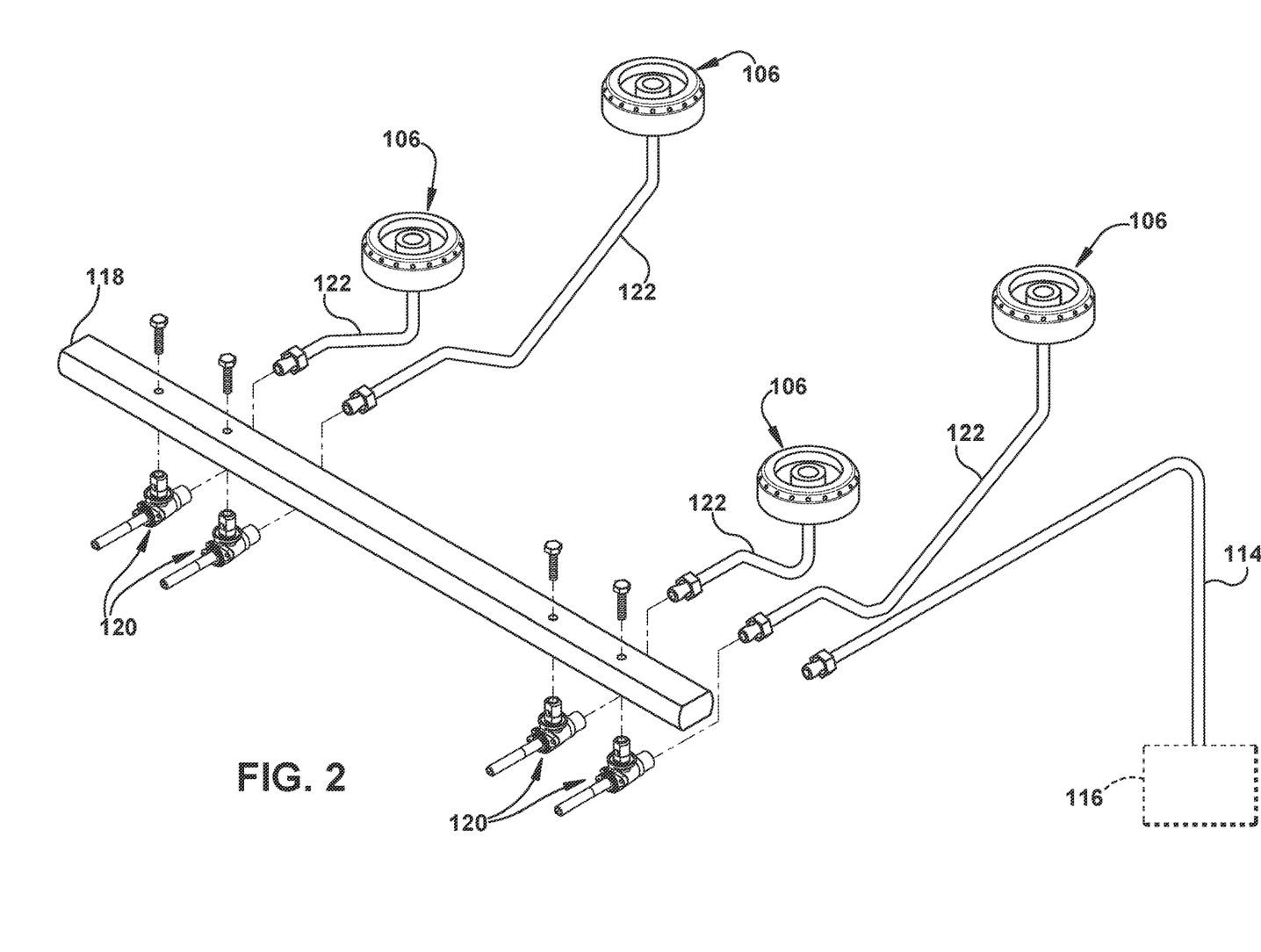
FIG. 2 is an exploded view of an example gas manifold of the cooking appliance for supplying gas to the cooktop burners, including gas valves as disclosed herein.

The appliance 100 can include a gas manifold adapted to deliver fuel (or a fuel/air mixture) to the gas burners 106. FIG. 2 illustrates an exemplary gas manifold shown in an exploded view. Specifically, a main gas line 114 directs gas from a gas source 116 (e.g., a source external to the cooking appliance 100) to a fuel rail 118. A plurality of gas valves 120 are fluidly connected to the fuel rail 118 and operable to selectively direct gas to respective gas burners 106 downstream via respective output tubes 122.

Figure 3:
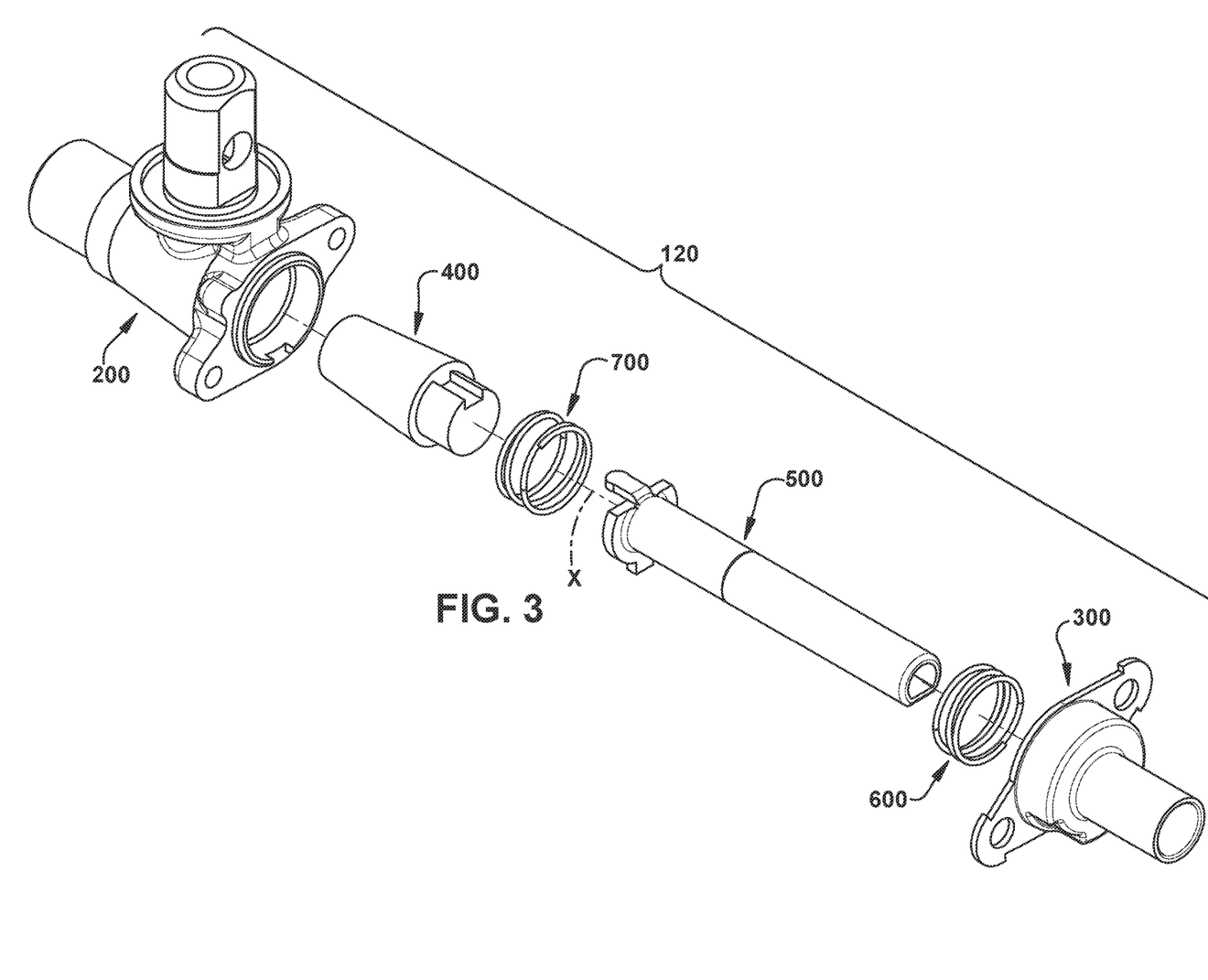
FIG. 3 is an exploded view of one of the gas valves, shown in FIG. 2, including a valve body, a cap, a plug, a stem, a first spring, and a second spring.

Moving now to FIG. 3, one of the gas valves 120 is shown in an exploded view. While the following disclosures are made with respect to a single gas valve 120 it is to be understood that said disclosures likewise can apply to the other gas valves 120 shown in FIG. 2. As shown, the gas valve 120 generally includes a valve body 200, a cap 300, a plug 400, a valve stem 500, a first spring 600, and a second spring 700, all aligned along a common axis 'X.' In an assembled state, discussed further below, the valve body 200 and the cap 300 are assembled together to form a valve housing, which defines a valve chamber therein. The valve housing houses the plug 400, the first and second springs 600, 700, and a portion of the valve stem 500.

Figure 4:
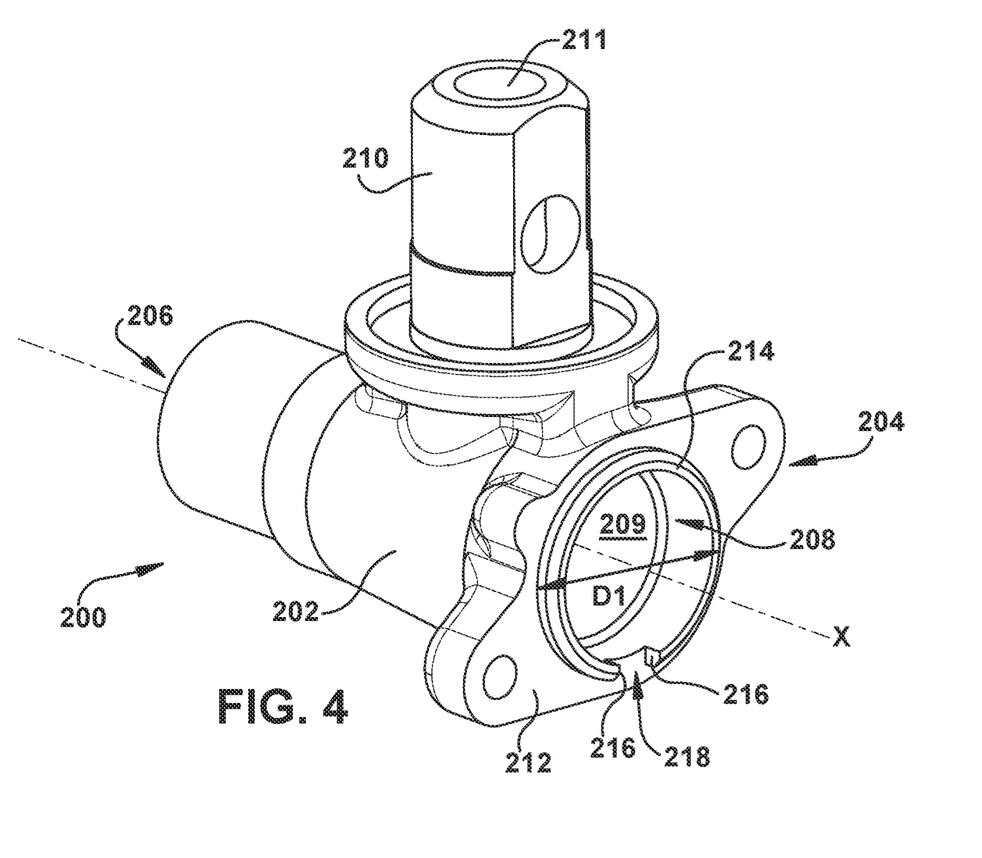
FIG. 4 is a perspective view of the valve body shown in FIG. 3.
Figure 10:
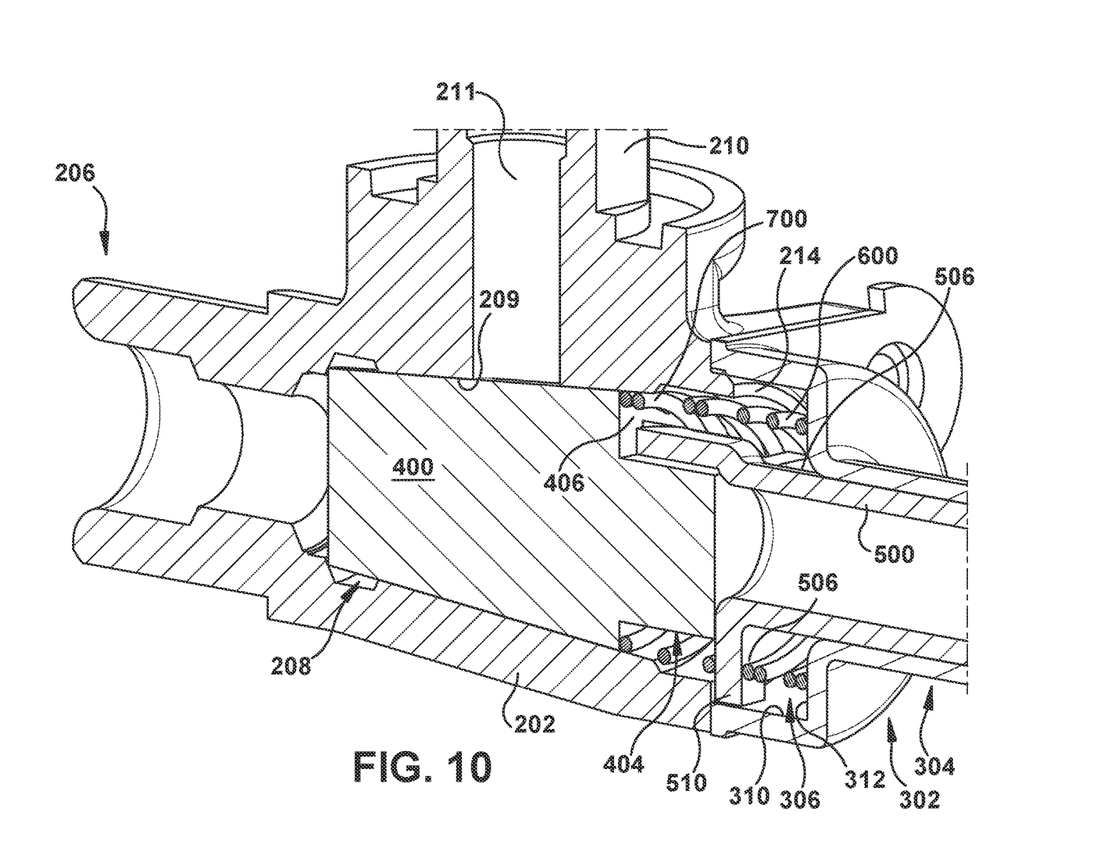
FIG. 10 is a perspective, cross-sectional view of the gas valve in an assembled state.

With reference to FIG. 4, the illustrated valve body 200 includes a main body 202 extending along the axis 'X' from a first end 204 to a second end 206. A main body chamber 208 (i.e., a through-bore) is formed within the main body 202 and extends between the first and second ends 204, 206 thereof. As further shown, the main body chamber 208 has a convergent inner circumferential wall 209 that is preferably conical in shape (as best shown in FIG. 10), which converges radially in a direction toward the second end 206. The main body 202 is shown as having a generally cylindrical shape, however the main body 202 may have any geometric configuration. A connector 210 extends outwards from the main body 202 (i.e., in a direction perpendicular to the axis 'X') and is configured to fluidly connect the valve body 200 to the fuel rail 118 (shown in FIG. 2). The connector 210 includes a passageway 211 extending therethrough such that the main body chamber 208 and the passageway 211 can be in fluid communication with one another.

The valve body 200 has a first face 212 disposed at the first end 204 of the main body 202 that is substantially planar (i.e., lying on an imaginary plane normal to the axis 'X'). Alternatively, the first face 212 can have surface areas with varying topography. Preferably the first face 212 is configured as a mating flange as shown, adapted to mate with an opposing, complementary mating flange of the cap 300, discussed below. The first end 204 further includes a lip 214 that stands proud of the first face 212, and which partially circumscribes a mouth of the main body chamber 208 in the first face 212. As the main body chamber 208 typically is cylindrical and thus its mouth circular, so too is the lip 214 typically circular. The lip 214 is formed integral with the main body 202 as a single piece-part, extending from the first face 212. Alternatively, the lip 214 may be formed separate and distinct from the main body 202 and subsequently secured thereto (e.g., via welding, soldering, etc.).

The lip 214 extends circumferentially about the mouth of the main body chamber 208 between opposing edges 216 thereof, which define a detent 218 formed as a cut-out in the otherwise continuous lip 214. Alternatively, it is contemplated that the lip 214 can include a series of small gaps formed at circumferentially spaced locations. In the shown example, the detent 218 is flush with the first face 212 (i.e., the detent 218 and the first face 212 are coplanar). Alternatively, the detent 218 may be recessed with respect to the first face 212 or protrude outward (i.e., axially) from the first face 212.

The edges 216 of the lip 214 are shown as being perpendicular to the first face 212, however this need not be the case. For example, one or both of the edges 216 may be sloped in a generally inwards direction (i.e., from an outermost surface of the lip 214 towards the first face 212, along the axis 'X'). Additionally and/or alternatively, portions of the lip 214 approaching either edge 216 thereof can be ramped (i.e., sloped) upward, away from the first face 212 in a direction along the axis 'X.'

Figure 5:
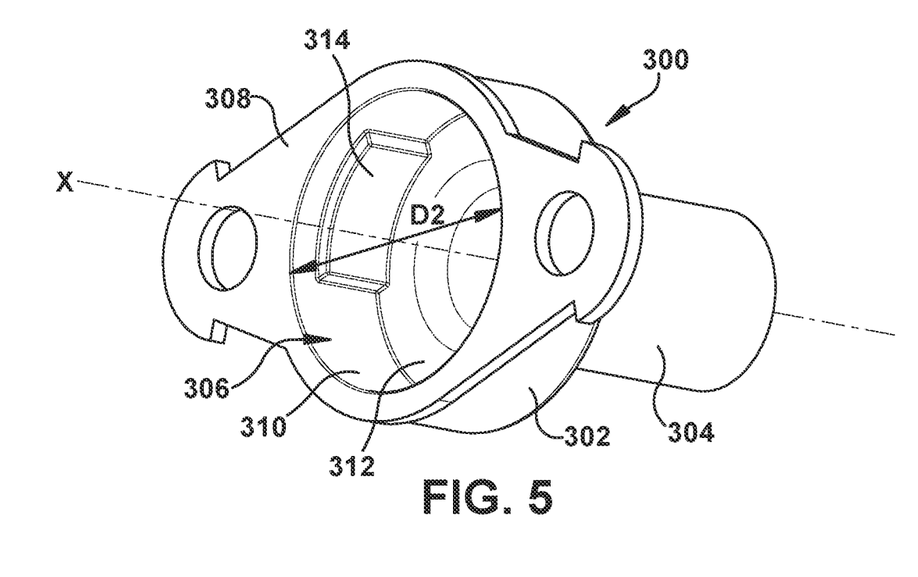
FIG. 5 is a perspective view of the cap shown in FIG. 3.

FIG. 5 illustrates the cap 300 that mates with the valve body 200 to define the valve chamber. The cap 300 has a cap body 302 and a sleeve 304, both being hollow and having generally cylindrical shapes. However, other geometric shapes are contemplated. The cap body 302 has a cap chamber 306 therein and the sleeve 304 extends outwards and away from the cap body 302 (along the axis 'X'). The cap body 302 and the sleeve 304 can be formed integral as a single piece-part, or the sleeve 304 can be formed separate and distinct from the cap body 302 and subsequently secured thereto.

As shown, the cap body 302 has a second face 308 at an end thereof (i.e., an end opposite from the sleeve 304), wherein similar to the first face 212 of the valve body 200, the second face 308 is substantially planar (i.e., lying on an imaginary plane normal to the axis 'X'). In other examples, the second face 308 can have surface areas with varying topography. Preferably the second face 308 is configured as a mating flange as shown, adapted to mate with the opposing mating flange (e.g. first face 212) of the valve body 200. With this said, it is noted that the first face 212 of the valve body 200 and the second face 308 of the cap body 302 have complementary geometries. Accordingly, in an assembled position (detailed further below), the first and second faces 212, 308 of the valve body 200 and the cap body 302, respectively, engage (i.e., contact) one another and form an appropriate seal therebetween.

Figure 11:
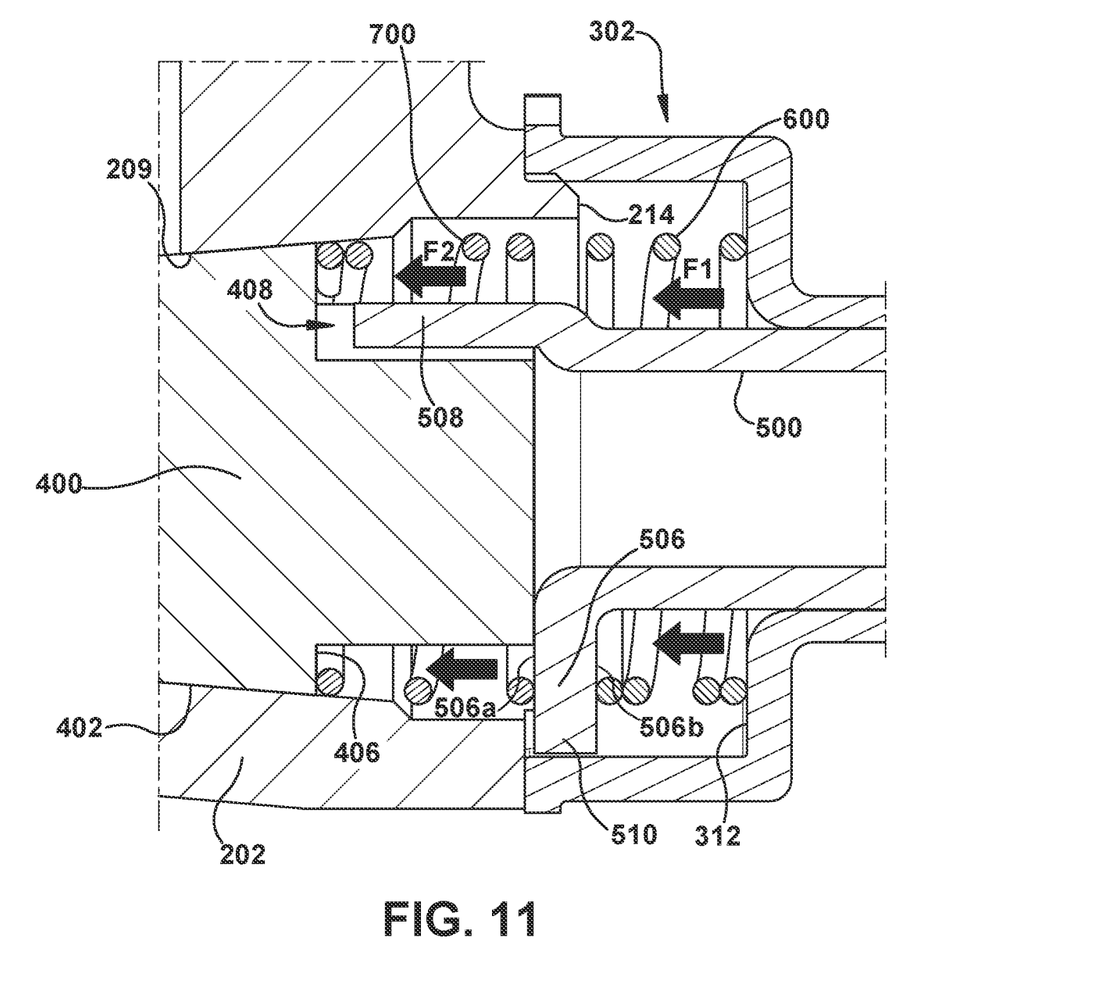
FIG. 11 is an enlarged cross-sectional view showing the engagement between the valve body and the cap when assembled.

The cap chamber 306 is depicted as being a recess formed in the cap body 302 with respect to the second face 308, and includes a side wall 310 and an end wall 312, which collectively delimit the cap chamber 306. The end wall 312 is spaced from the second face 308 (along the axis 'X') via the side wall 310. As shown, the side wall 310 has an inner diameter D2. As will be explained further below, the inner diameter D2 of the side wall 310 is just larger than (i.e. complementary to) the outer diameter D1 of the lip 214 (shown in FIG. 4) such that in an assembled state, the side wall 310 receives and circumscribes the lip 214 (as shown in FIGS. 10 and 11). Further, a stop 314 is disposed on the side wall 310 and protrudes radially inward therefrom. The stop 314 is formed integral with the cap body 302 (i.e., as a single piece-part). Alternatively, the stop 314 may be formed separate and distinct from the cap body 302 and subsequently secured to the side wall 310 (e.g., via soldering, welding, etc.).

In the depicted example, the stop 314 extends axially (i.e., along the axis 'X') from the end wall 312 towards the second face 308, but it does not extend all the way to the second face 308. Rather, an axial gap is formed between the second face 308 and the stop 314. Of note, the length of the axial gap (along the axis 'X') can be substantially equal to or greater than the axial length of the lip 214 (i.e. the height of lip 214 above the first face 212 of the valve body 200). Moreover, the stop 314 extends only partially along the circumference of the side wall 310. It does not extend completely (circumferentially) along the side wall 310.

Figure 6:
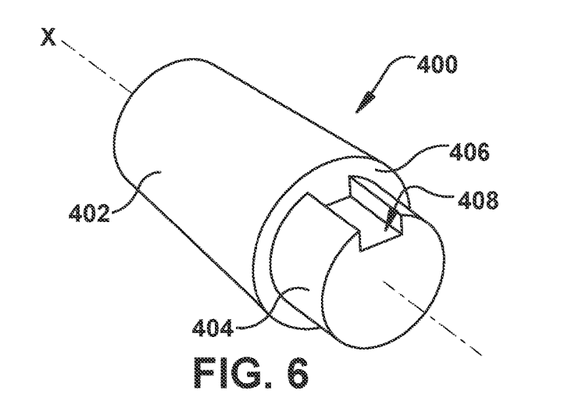
FIG. 6 is a perspective view of the plug shown in FIG. 3.

With respect to FIG. 6, the valve plug 400 includes a plug body 402 having a substantially convergent (preferably conical) shape. Of note, the shape of the plug body 402 is generally complementary to that of the inner circumferential wall 209 of the main body chamber 208. A plug protrusion 404 stands proud of an end wall 406 of the plug body 402 (along the axis 'X') and has a generically cylindrical shape. The plug body 402 and the plug protrusion 404 are formed integral with respect to one another (i.e., as a single piecepart); alternatively, the plug protrusion 404 can be formed separate and distinct from the plug body 402 and subsequently secured thereto. A slot 408 is formed in the plug protrusion 404 and extends therein along the axis 'X.' Specifically, the slot 408 is formed as a recess within a circumferential surface of the plug protrusion 404 and extends along the entire axial length thereof. Alternatively, the slot 408 need not extend along the entire axial length of the plug protrusion 404.

Figures 7, 8:
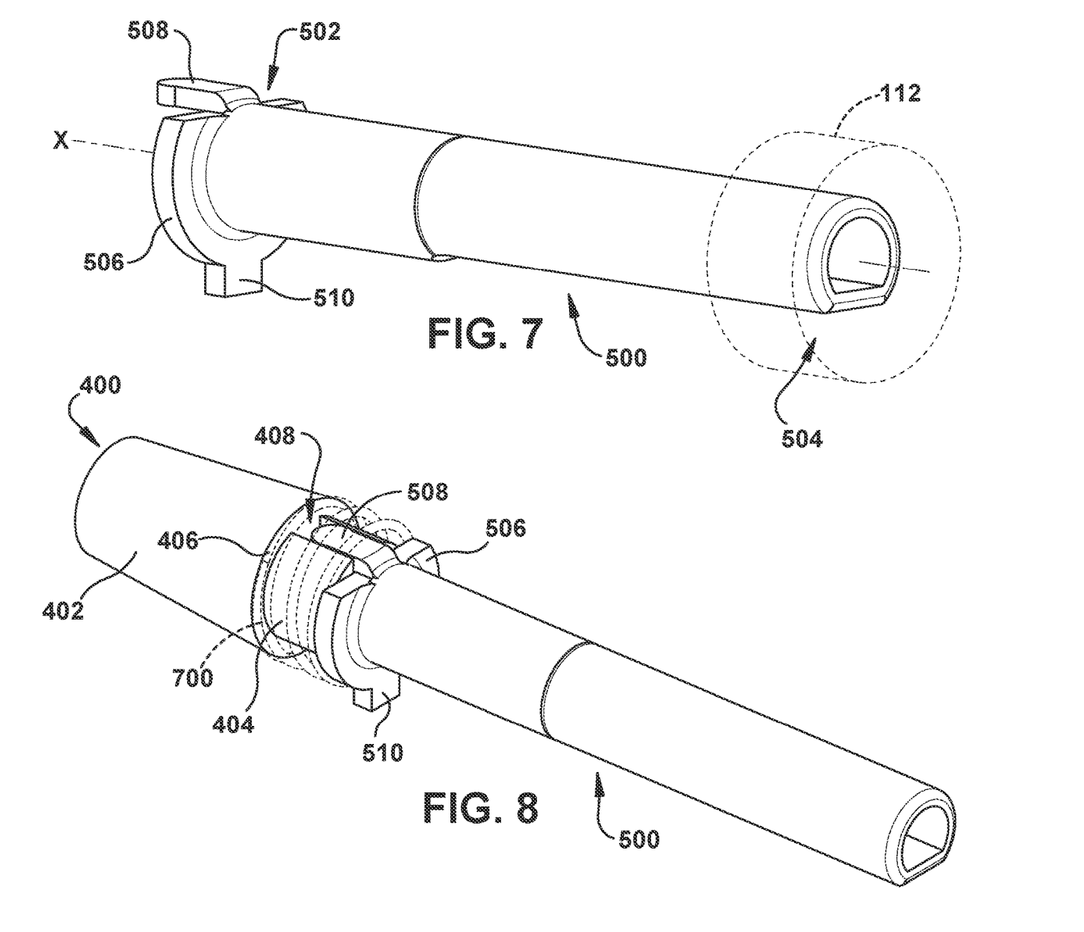
FIG. 7 is a perspective view of the stem shown in FIG. 3.
FIG. 8 is a perspective view of the plug and stem assembled with respect to one another.

Now moving on to FIG. 7, the valve stem 500 is shown in a perspective view. The valve stem 500 has a substantially cylindrical shape and extends between first and second ends 502, 504 along the axis 'X.' A peripheral flange 506 extends radially outwards from the first end 502, and a drive tang 508 extends axially outwards (i.e., along the axis 'X') beyond the first end 502. In the depicted example, the flange 506 does not extend completely about the valve stem 500 (i.e., circumferentially). That is, as shown, the flange 506 does not extend radially from the valve stem 500 in an area associated with the drive tang 508. However, it is contemplated that the flange 506 can extend radially outwards from the valve stem 500 about its entire circumference (at the first end 502).

As further shown, a lock tang 510 (e.g., a tab) extends radially outwards from a portion of the flange 506. Specifically, the lock tang 510 extends radially outwards from the flange 506 in an area thereof that is diametrically opposite from the drive tang 508. In the shown example, the flange 506, the drive tang 508, and the lock tang 510 are all formed integral with one another and with the valve stem 500. However, it is contemplated that any or all of these components can be formed separate and distinct from one another and subsequently secured to the valve stem 500. The second end 504 of the valve stem 500 is configured to engage with a control knob 112 (schematically shown in FIG. 7). Accordingly, as will be explained further below, when a user translates and/or rotates the control knob 112, the valve stem 500 likewise translates and/or rotates in a corresponding manner.

Returning to FIG. 3, the first and second springs 600, 700 are shown. As depicted, the first and second springs 600, 700 are both compression springs that resist compressive forces applied axially (i.e., along the axis 'X'), as will be further discussed below. The first and second springs 600, 700 are depicted as open-coil helical springs. However, it is contemplated that the first spring 600 and/or the second spring 700 can be any other configuration of a compression spring.

Assembly of the aforementioned gas valve 120 will now be discussed. It is to be understood that the below detailed steps are only an example of assembly, and that said steps need not occur in the specified order or in the exact manner. With reference to FIG. 8, the plug 400, the valve stem 500, and the second spring 700 (depicted in dashed lines to better visualize the engagement of the drive tang 508 with the slot 408, described below) are shown assembled. Initially, the second spring 700 can be fitted over the plug protrusion 404 of plug 400, so that it contacts/engages against the end wall 406 of the plug body 402. Thereafter, the first end 502 of the valve stem 500 is disposed (axially) adjacent the plug 400 such that drive tang 508 aligns and is received within the slot 408 formed in the plug protrusion 404. As assembled (and shown in FIG. 8), the drive tang 508 is free to translate axially within the slot 408 without significant hindrance. At the same time, it fixes the rotational positions of the valve stem 500 and the plug 400 such that as the valve stem 500 rotates, the plug 400 will correspondingly rotate. As further shown, the other end of the second spring 700 contacts/engages against the flange 506 of the valve stem 500. In this manner, the second spring 700 peripherally surrounds both the plug protrusion 404 and the drive tang 508, and extends axially between the plug body 402 (i.e., at the end wall 406 thereof) and the flange 506 of the valve stem 500.

Figure 9:
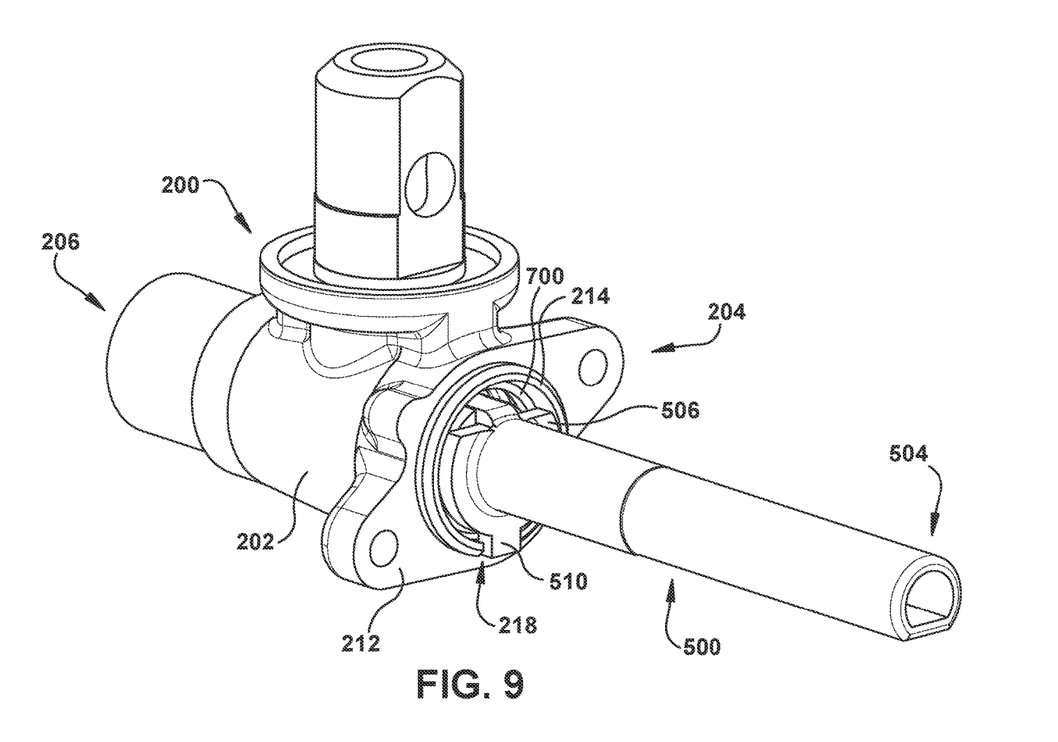
FIG. 9 is a perspective view of the plug and stem assembly (shown in FIG. 8) installed within the valve body, and in a locked position.

Now moving on to FIG. 9, the sub-assembly shown in FIG. 8 is partially inserted into the valve body 200 such that the plug 400 and the second spring 700 are received and axially aligned within the main body chamber 208 (as better shown in FIG. 10). More specifically, in the depicted example, the valve stem 500 is shown in a locked position (discussed further below), wherein the flange 506 thereof is peripherally surrounded by the lip 214 of the valve body 200, and such that the lock tang 510 is received within the detent 218 formed in the lip 214. In other words, the aforementioned detent 218 (delimited between the opposing edges 216 of the lip 214, shown in FIG. 4) is sized and shaped to accept and receive the lock tang 510 therein, when the valve stem 500 is in the locked position. Accordingly, as will be further detailed below, when the valve stem 500 is in the locked position, the valve stem 500 is incapable of rotating due to the lock tang 510 being received within the detent 218 formed in the lip 214 and the edges 216 of the lip 214 obstructing the lock tang 510 (and thereby the valve stem 500) from rotating when in the locked position.

The first spring 600 is fitted over the valve stem 500, followed by the cap 300 such that the first spring 600 is disposed between and engages against the flange 506 of the valve stem 500 (i.e. the opposite face thereof compared to where the second spring 700 is engaged) and the end wall 312 of the cap 300. So assembled, with the distal portion of the valve stem 500 extending through and protruding from the hollow sleeve 304 of the cap 300 (best shown in FIG. 10), the cap 300 is secured to the valve body 200 (e.g. at their respective first and second (mating) surfaces 212 and 308 via conventional fasteners, such as bolts, screws, etc.

Now with reference to FIG. 10, the gas valve 120 is shown in an assembled state wherein the first face 212 of the valve body 200 and the second face 308 of the cap body 302 sealingly engage one another. In the assembled state, the valve body 200 and the cap 300 together form a valve housing, wherein the main body chamber 208 and the cap chamber 306 together define a valve chamber, which houses the plug 400, the flange 506 of the valve stem 500, and the first and second springs 600, 700.

As seen in FIG. 10, a radially distal end of the lock tang 510 is in close proximity to the side wall 310 of the cap body 302. It is to be understood that there is no substantial engagement between the lock tang 510 and the side wall 310 of the cap body 302. That is, the lock tang 510 is free to translate (within the cap chamber 306) with respect to the side wall 310 of the cap body 302. As will be further explained below, when the valve stem 500 is in an unlocked position, the lock tang 510 is free to rotate (within the cap chamber 306) to a predetermined position without significant hindrance from the side wall 310.

FIG. 10 depicts the valve stem 500 being in direct contact with the sleeve 304 (i.e., no intervening components therebetween). However, it is contemplated that the valve stem 500 can be in indirect contact with the sleeve 304 (e.g., via an intermediate bearing), or even that the valve stem 500 can be spaced from the sleeve 304 such that there is no contact therebetween. Regardless, it is to be understood that the valve stem 500 is free to both translate and rotate with respect to the sleeve 304.

Now moving on to FIG. 11, an enlarged, cross-sectional view of the engagement between the valve body 200 and the cap 300 is shown, with the valve stem 500 in the locked position. As mentioned above, in the assembled state the second spring 700 extends axially between the end wall 406 of the plug body 402 and a first surface 506a of the flange 506 of the valve stem 500, which tends to bias the valve stem 500 and the plug 400 axially away from one another, such that the valve stem 500 is urged to be fully seated within the plug body 402. Whereas the first spring 600 extends axially between an opposite second surface 506b of the flange 506 of the valve stem 500 and the end wall 312 of the cap body 302, which tends to bias the valve stem 500 axially toward the plug 400, such that the lock tang 510 is axially advanced and seated within the detent 218 in a 'locked' position of the valve stem 500, which inhibits rotation thereof as will be further described. In order to unlock the valve stem 500, one draws the valve stem 500 axially outward, against the bias of the first spring 600 in order to unseat the lock tang 510 from the detent 218, thus permitting rotation as also will be further described.

More specifically, the first spring 600 exerts an axial (biasing) force F1 on the flange 506 in the direction of the plug 400, tending to seat the lock tang 510 within the detent 218. Separately, the second spring 700 exerts an axial (biasing) force F2 on the plug 400 tending to seat the plug 400 in sealing engagement with the inner circumferential wall 209 of the main body chamber 208.

Accordingly, the first and second springs 600, 700 exert respective forces F1, F2 in the same axial direction in order to bias both the valve stem 500 and the plug 400 axially away from the end wall 312 of the cap body 302 and towards the second end 206 of the main body 202 (shown in FIG. 10). In this manner, when the valve stem 500 is in the locked position, it is incapable of being rotated due to the flange 506 being biased towards the plug 400 such that the lock tang 510 is received within the detent 218 of the valve body 200. That is, in the locked position the interaction between the lock tang 510 and the detent 218 inhibits rotation of the valve stem 500 relative to the valve body 200, effectively preventing actuation of the gas valve 120. However, upon drawing the valve stem 500 axially away from the valve body 200, the lock tang 510 becomes withdrawn and therefore disengaged from the detent 218 in the lip 214 (of the valve body 200), thereby permitting rotation of the valve stem 500 to actuate the gas valve 120. Notably, in both the locked and unlocked positions of the valve stem 500, the second spring 700 effectively urges the plug 400 into seated engagement with the inner circumferential wall 209 of the main body chamber 208, so that the plug 400 remains fully seated regardless of the actuation state (or locked/unlocked position) of the valve stem 500.

Referring to FIG. 2, the assembled gas valve 120 can be connected between the fuel rail 118 and a burner output tube 122 in an otherwise conventional manner. Specifically, the connector 210 of the valve body 200 (shown in FIG. 4) can be inserted and sealed within the fuel rail 118 such that the passageway 211 and the gas source 116 are in fluid communication. Further, the second end 206 (outlet port) of the main body 202 is connected to the output tube 122 leading to a respective burner 106. With respect to FIG. 10, with the plug 400 and the inner circumferential wall 209 of the main body chamber 208 being in sealed engagement, and with the valve stem 500 being in the locked position, the plug 400 obstructs fluid communication between the passageway 211 and the main body chamber 208, and thus prevents fluid communication between the passageway 211 and the output tube 122. To permit fluid communication between the passageway 211 and the output tube 122, the plug 400 must be rotated to fluidly connect the passageway 211 and the output tube 122 (via aperture(s) or slots formed in the plug, not shown). In order to rotate the plug 400 to align its apertures/slots in order to deliver fuel (e.g., gas) from the fuel rail 118 to the output tube 122, the valve stem 500 must be unlocked by pulling that valve stem 500 axially away from the valve body 200 against the bias of the first spring 600.

For example, with initial reference to FIG. 1 to unlock the valve stem 500 for rotation a user may pull the control knob 112 (axially) outwards, in a direction away from the cooking appliance 100 (and the valve body 200) with sufficient force to overcome the biasing force F1 of the first spring 600. Doing so will axially translate the valve stem 500 (along arrow A1 in FIG. 12) outwards and away from the valve body 200 such that the lock tang 510 is axially removed from the detent 218 formed in the lip 214 surrounding the mouth of the main body chamber 208. Moreover, even when the flange 506 is axially moved away from the plug 400, the second spring 700 remains in compression and continues to bias the plug 400 (via biasing force F2) into continuous sealing engagement with the inner circumferential wall 209 of the main body chamber 208. That is, the second spring 700 is sufficiently compressed in the locked state of the valve stem 500 that after withdrawing the valve stem 500 axially from the locked position to an unlocked position (i.e., such that the flange 506 is withdrawn from the plug 400 such that the lock tang 510 is no longer received within the detent 218), the second spring 700 continues to apply sufficient compressive force (i.e., force F2) against the plug 400 to maintain it in sealing engagement, properly seated with the inner circumferential wall 209 of the valve body 200. Moreover, the plug 400 can be rotated while in such sealing engagement in order to adjust the alignment of gas-passage features (e.g. apertures, slots, passages, etc.) in the plug 400, thereby establishing (and/or adjusting a degree of) fluid communication between the fuel rail 118 and the output tube 122.

Figure 12:
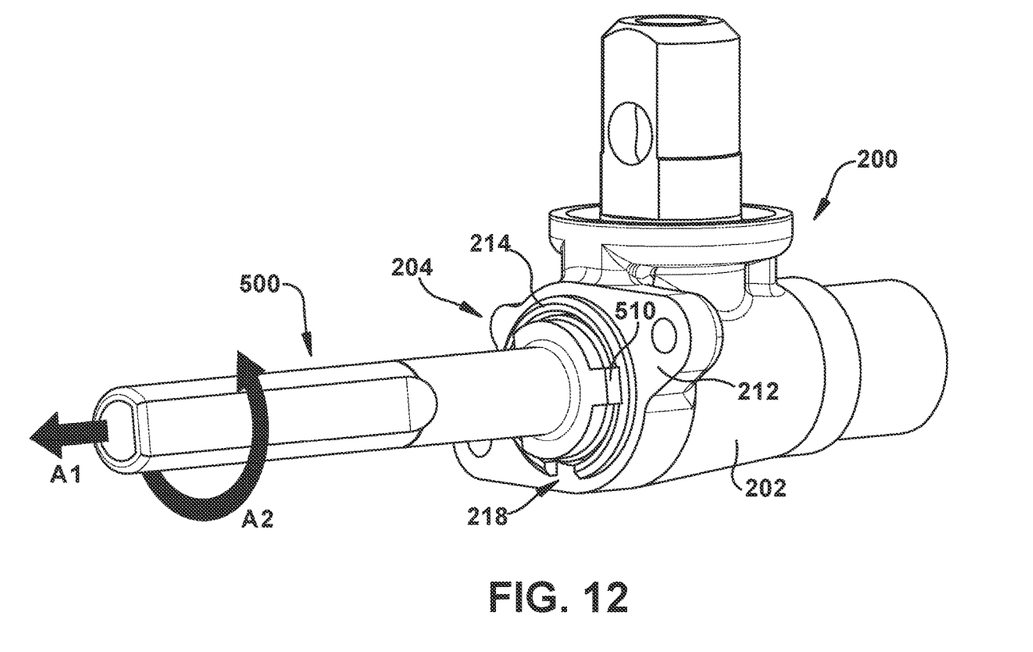
FIG. 12 is a perspective view of the assembled valve (omitting the cap and first spring) with the plug and stem assembly (shown in FIG. 8) in an unlocked and rotated position.

Referring to FIG. 12 (omitting the cap 300 and the first spring 600 to better show the orientation of the valve stem 500), when the valve stem 500 is moved out of the locked position and into the unlocked position (i.e., the lock tang 510 is no longer received within the detent 218), the valve stem 500 can be rotated (e.g. along the direction of arrow A2 shown in FIG. 12) via the user rotating the control knob 112. Notably, the drive tang 508 is long enough so that as the valve stem 500 is withdrawn from the locked position the drive tang 508 remains at least partially engaged within the slot 408 such that rotation of the valve stem 500 will result in rotation of the plug 400. As further shown in FIG. 12, the lock tang 510 of the valve stem 500 closely follows the contour of the lip 214 as the valve stem 500 is being rotated in the unlocked (axially withdrawn) state of the valve stem 500. The valve stem 500 is capable of rotating until the lock tang 510 contacts the stop 314 formed on the side wall 310 of the cap body 302 (shown in FIG. 5). That is, the stop 314 obstructs further rotation of the valve stem 500 by acting as a physical barrier to the lock tang 510.

After the user has finished rotating the control knob 112 to a desired position, the user releases the control knob 112, at which time, the valve stem 500 is driven axially towards the valve body 200 via the biasing force F1 of the first spring 600. As will be appreciated, the lock tang 510 thus contacts and rides along the lip 214 as the valve stem 500 is rotated, with the lip 214 acting as a rotational bearing for the lock tang 510, which holds the valve stem 500 in an unlocked state except when the lock tang 510 is rotationally aligned with the detent 218. Once the valve stem 500 is rotated such that the lock tang 510 and detent 218 are re-aligned, the biasing force F1 of the first spring 600 will re-seat the lock tang 510 within the detent 218, once again locking the valve stem 500 against rotation.

In short, the above-noted gas valve 120 configuration provides a two-step procedure required in order to initiate a flow of fuel to a gas burner 106 from an initial OFF state, corresponding to a locked state of the valve stem 500. Specifically, the valve stem 500 must first be withdrawn (e.g. via its control knob 112) axially outward, and then rotated with the valve stem 500 still withdrawn to initiate a flow of gas from the gas source 116, through the gas valve 120 and to the gas burner 116. This two-step procedure can be realized, in part, by positioning the first and second springs 600, 700 on opposite respective sides of the same flange 506. That is, the first spring 600 (being compressed between the end wall 312 of the cap body 302 and the second surface 506b of the flange 506) biases the flange 506, the drive tang 508 and the lock tang 510 towards the plug 400, and the second spring 700 (being compressed between the first surface 506a of the flange 506 and the plug 400) continuously biases the plug 400 into contact with the inner circumferential wall 209 of the main body chamber 208. In this configuration, the compressive force F1 of the first spring 600 is greater than the compressive force F2 of the second spring 700 in an assembled state of the gas valve 120. This ensures that the flange 506 (as well as the drive tang 508 and the lock tang 510) remain biased towards the plug 400, even though the second spring 700 is compressed oppositely against the same flange 506 to generate the biasing force F2, which ensures constant sealed engagement between the plug 400 and the inner circumferential wall 209 of the main body chamber 208 regardless of the locked or unlocked state of the valve stem 500.

The invention has been described with reference to example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A gas valve for a cooking appliance, the gas valve comprising:
    a valve housing defining a valve chamber therein;
    a plug disposed within the valve chamber and configured to selectively permit gas to flow through the gas valve;
    a valve stem interacting with said plug such that rotation of said valve stem correspondingly rotates the plug to selectively permit said flow, said valve stem being axially translatable between a locked position wherein rotation thereof is inhibited and an unlocked position wherein rotation thereof is permitted;
    a first spring exerting a compressive force in a first direction against said valve stem, toward the plug, to bias said valve stem into said locked position; and
    a second spring exerting a compressive force in said first direction against said plug in order to seat said plug within said valve chamber regardless whether said valve stem is in said locked or said unlocked position,
    said valve stem comprising a flange having opposite first and second flange surfaces, said first spring being compressively engaged between the first flange surface and the valve housing, said second spring being compressively engaged between the second flange surface and the plug, the compressive force of said first spring being greater than the compressive force of said second spring.

2. The gas valve of claim 1, the first and second springs being arranged coaxially with respect to the valve stem.

3. The gas valve of claim 1, the valve stem having first and second ends, the flange being disposed adjacent to the first end of the valve stem, the second end of the valve stem being configured to engage with a control knob outside of said valve housing.

4. The gas valve of claim 3, the valve stem further comprising a drive tang extending axially from the first end thereof, the drive tang being axially, slidably received within a slot formed in the plug, wherein the second spring surrounds the drive tang.

5. The gas valve of claim 4, the flange and the drive tang of said valve stem and said first and second springs all being disposed within said valve housing.

6. The gas valve of claim 1, said valve housing comprising a valve body defining a valve body chamber and a cap, said valve body and said cap being assembled together to define said valve chamber therebetween, said valve chamber comprising said valve body chamber, said plug being seated within said valve body chamber and said first spring being compressively engaged between said valve stem and the cap.

7. The gas valve of claim 6, the cap having a side wall that extends from an end wall, the side wall surrounding the first spring.

8. The gas valve of claim 7, the valve body having a lip surrounding a mouth of said valve body chamber, and the side wall of the cap peripherally surrounding the lip.

9. The gas valve of claim 8, said first spring being compressively engaged between the first flange surface and the end wall of said cap, the lip having a detent formed therein, and the valve stem having a lock tang extending radially outwards from the flange, wherein the detent is configured to receive the lock tang therein when the valve stem is in said locked position in order to inhibit rotation of said valve stem.

10. A gas cooktop appliance, comprising:
    a gas burner provided at a cooktop surface;
    a control knob located above a control panel and being axially translatable between a locked position wherein rotation thereof is inhibited and an unlocked position wherein rotation thereof is permitted; and a gas valve operatively coupled to said control knob, the gas valve comprising:
a valve housing defining a valve chamber therein;
a plug disposed within the valve chamber and configured to selectively permit gas to flow therethrough to the gas burner;
a first spring exerting a compressive force that biases the control knob into said locked position toward the control panel;
a second spring exerting a compressive force against said plug in order to seat said plug within said valve chamber regardless whether said control knob is in said locked or said unlocked position, and
a valve stem having a first end and a second end, the first end being disposed within the valve chamber and the second end being coupled with the control knob such that rotation of the control knob correspondingly rotates said valve stem,
said valve stem comprising a flange having opposite first and second flange surfaces, said first spring being compressively engaged between the first flange surface and the valve housing, said second spring being compressively engaged between the second flange surface and the plug, the compressive force of said first spring being greater than the compressive force of said second spring.

11. The gas cooktop appliance of claim 10, the valve stem comprising a drive tang extending axially from the first end thereof, the drive tang being axially, slidably received within a slot formed in the plug such that rotation of said valve stem correspondingly rotates the plug to selectively permit said flow.

12. The gas cooktop appliance of claim 10, said first and second springs being arranged coaxially with respect to a rotational axis of the control knob.

13. The gas cooktop appliance of claim 10, said valve housing comprising a valve body defining a valve body chamber and a cap, said valve body and said cap being assembled together to define said valve chamber therebetween, said valve chamber comprising said valve body chamber, said plug being seated within said valve body chamber and said first spring being compressively engaged between said valve stem and the cap.

14. The gas cooktop appliance of claim 13, the cap having a side wall that surrounds the first spring.

15. The gas cooktop appliance of claim 14, the valve body having a lip surrounding a mouth of said valve body chamber, and the side wall of the cap peripherally surrounding the lip.

16. The gas cooktop appliance of claim 15, the flange disposed at a first end of the valve stem, the control knob being coupled with the valve stem at a second end thereof, said flange being disposed within the valve chamber, said first spring being compressively engaged between the first flange surface and said cap, the lip having a detent formed therein, and the valve stem having a lock tang extending radially outwards from the flange, wherein the detent is configured to receive the lock tang therein when the control knob is in said locked position in order to inhibit rotation of said control knob.

17. A gas valve for a cooking appliance, the gas valve comprising:
a valve housing including a valve body and a cap assembled together to define a valve chamber therebetween, the valve body having a lip surrounding a mouth of a valve body chamber thereof, said valve chamber comprising said valve body chamber, the lip having a detent formed therein;
a plug seated within the valve body chamber and configured to selectively permit gas to flow through the gas valve, the plug having a slot formed therein;
a valve stem having first and second ends, said valve stem comprising a flange, a drive tang, and a lock tang all located at the first end thereof, the flange having opposite first and second flange surfaces, the drive tang extending axially from the first end of the valve stem and being axially, slidably received within the slot formed in the plug, and the lock tang extending radially outwards from the flange, said drive tang interacting with said slot in said plug such that rotation of the valve stem correspondingly rotates the plug to selectively permit said flow, said valve stem being axially translatable between a locked position wherein rotation thereof is inhibited and an unlocked position wherein rotation thereof is permitted, wherein the detent is configured to receive the lock tang therein when the valve stem is in said locked position in order to inhibit rotation of said valve stem;
a first spring compressively engaged between the first flange surface and the cap and exerting a compressive force in a first direction against the flange, toward the plug, to bias said valve stem into the locked position; and
a second spring compressively engaged between the second flange surface and the plug and exerting a compressive force in said first direction against said plug in order to seat said plug within said valve chamber regardless whether said valve stem is in said locked or said unlocked position.

* * * * *